(12) United States Patent
Kertscher et al.

(10) Patent No.: US 7,530,382 B2
(45) Date of Patent: May 12, 2009

(54) DEVICE FOR CONTINUOUSLY PRODUCING DRIP IRRIGATION TUBES

(75) Inventors: Eberhard Kertscher, Yvonand (CH); Thomas Bernauer, Neuchâtel (CH)

(73) Assignee: The Thomas Machines S.A., Couvet (CH)

( * ) Notice: Subject to any disclaimer, the term of this patent is extended or adjusted under 35 U.S.C. 154(b) by 569 days.

(21) Appl. No.: 10/529,082

(22) PCT Filed: Sep. 26, 2003

(86) PCT No.: PCT/CH03/00644

§ 371 (c)(1), (2), (4) Date: Mar. 24, 2005

(87) PCT Pub. No.: WO2004/028778

PCT Pub. Date: Apr. 8, 2004

(65) Prior Publication Data

US 2006/0162867 A1 Jul. 27, 2006

(30) Foreign Application Priority Data

Sep. 27, 2002 (EP) .................. 02405837

(51) Int. Cl.
*B29C 47/02* (2006.01)
(52) U.S. Cl. ...................... 156/497; 156/500
(58) Field of Classification Search .......... None
See application file for complete search history.

(56) References Cited

U.S. PATENT DOCUMENTS 2,048,942 A * 7/1936 McConnell ............. 273/149 R (Continued)

FOREIGN PATENT DOCUMENTS

EP 0 480 632 A2 4/1992

(Continued)

*Primary Examiner*—Richard Crispino
*Assistant Examiner*—Barbara J. Musser
(74) *Attorney, Agent, or Firm*—Dorsey & Whitney LLP

(57) ABSTRACT

A device for continuously producing drip irrigation tubes comprises an extruding device (1) for producing a tube body (2), a calibrating device (3), and a cooling device (19) for the tube body (6). In addition, a feeding device (5) for feeding dosing elements (6) into the tube body (2) and means for joining these dosing elements (6) to the inner wall of the tube body (2) are provided. This feeding device is comprised of a pressing element (17) that is formed by the end area of the guideway (4) while protruding into the extruded tube body (2), and of a pressing member (18) that can be pressed against the tube body (2) from the exterior in the vicinity of pressing element (17). The calibrating device (3) is made of a tubular body (22) whose insertion area (23) narrows to the desired diameter of the tube body (2) and whose longitudinally elongated body area (24) protrudes into the cooling device (19). The longitudinally elongated body area (24) of the tubular body (22) of the calibrating device (3) is provided with a recess (27) into which the pressing member (18) protrudes so that the pressing and joining process of the dosing elements (9) against/to the inner wall of the tube body (22) ensues inside the calibrating device (3). This results in the tube body (2) not cooling too quickly before the joining process, and in an optimal joining to the dosing elements (9) without requiring the dosing elements to be preheated.

13 Claims, 3 Drawing Sheets

U.S. PATENT DOCUMENTS

Figure 1:
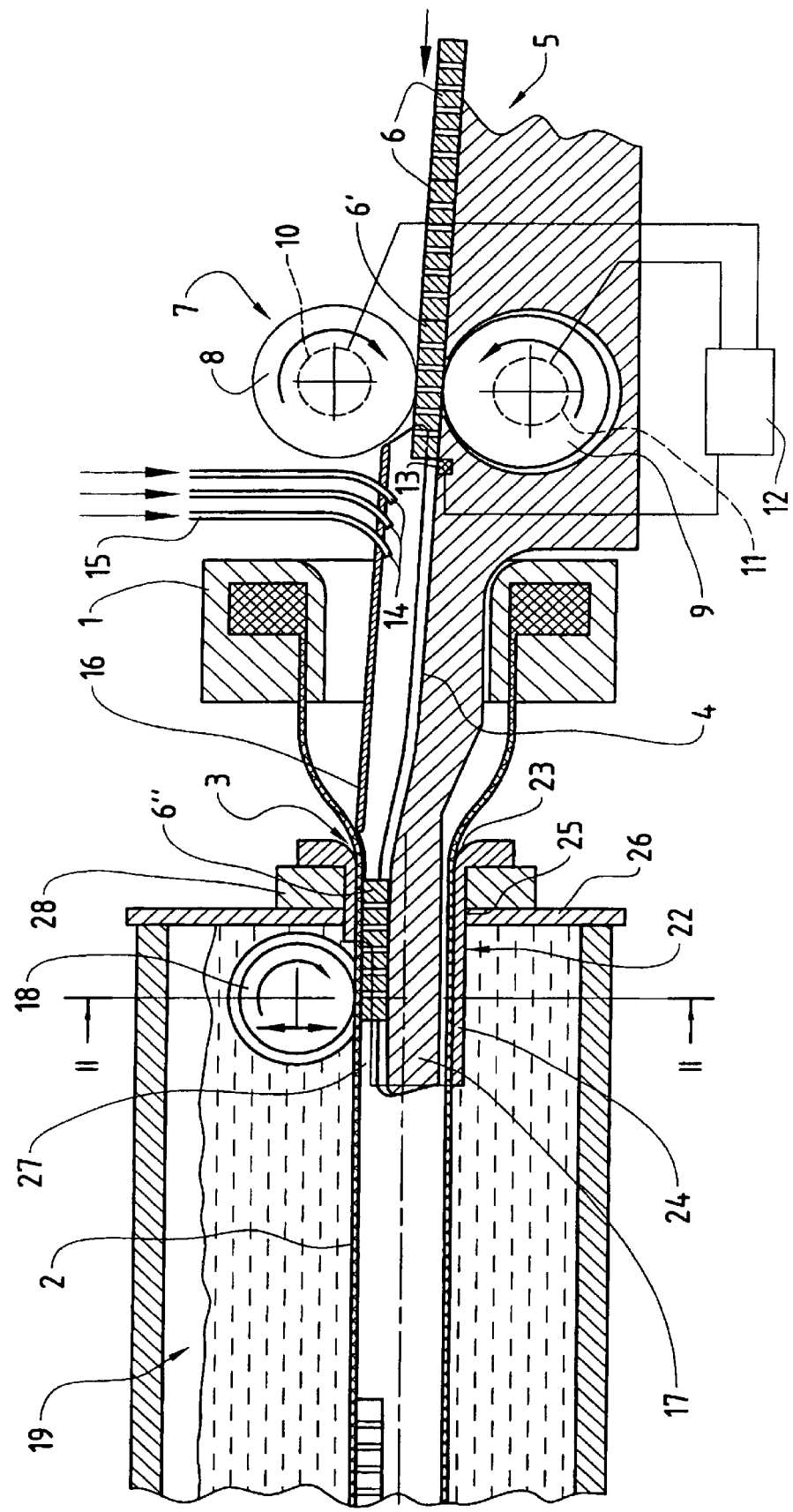

| | | | |
|---|---|---|---|
| 2,234,536 A * | 3/1941 | Tilson | 101/301 |
| 2,597,041 A * | 5/1952 | Stokes et al. | 53/141 |
| 5,016,182 A * | 5/1991 | Bergland et al. | 700/125 |
| 5,324,371 A * | 6/1994 | Mehoudar | 156/64 |
| 6,280,554 B1 | 8/2001 | Lambert et al. | |
| 6,308,902 B1 | 10/2001 | Huntley | |
| 6,896,758 B1 * | 5/2005 | Giuffre' | 156/244.13 |
| 2001/0053116 A1 * | 12/2001 | Sato | 369/77.1 |

FOREIGN PATENT DOCUMENTS

| | | |
|---|---|---|
| EP | 0 970 602 A1 | 1/2000 |
| WO | WO 99/62691 A1 | 12/1999 |
| WO | WO 00/10378 A1 | 3/2000 |

\* cited by examiner

DEVICE FOR CONTINUOUSLY PRODUCING DRIP IRRIGATION TUBES

The present invention relates to a device for continuously producing drip irrigation tubes comprising an extruding device for producing a tube body, a calibrating device, and a cooling device for the tube body, a feed apparatus for feeding dosing elements into the tube body along a guideway and means for connecting the dosing elements to the inner walling of the tube body, comprising a pressing element which is formed by the end region of the guideway and protrudes into the extruded tube body, and a pressing roller that is able to be pressed against the tube body from the exterior in the region of the pressing element, the calibrating device being formed by a tubular body the feed region of which narrows to the desired diameter of the tube body, and the longitudinally elongated body area of which protrudes into the cooling device, and which is provided with a recess in which the pressing rollers protrudes so that the pressing and connecting step of the dosing element with respect to the inner walling of the tube body takes place inside the calibrating device.

With known devices of this kind drip irrigation tubes are produced with which a direct irrigation of plants is achievable. Installed in this tube in the region of each plant are dosing elements through which the water is let out dropwise via a bore. Through this direct dropwise irrigation of the individual plants a large amount of water is not wasted unnecessarily, as usually happens with irrigation systems by means of which the water is distributed over a large area through spraying installations. With drip irrigation an extremely economical system is applied; the water can be used very sparingly.

Shown in EP-A-0 970 602 is a device for manufacturing drip irrigation tubes of this kind. Here a tube body is created by means of an extruding device, which body passes through a calibrating and cooling device. Inserted successively into the tube body are dosing elements which are continuously pushed forward. As soon as the foremost dosing element comes into contact with the extruded tube walling, it is pulled along, and is connected to the tube body by means of a pressing body installed in the tube body and a pressing belt acting outside on the tube walling. The outlet aperture for the water is then made in the tube walling in a known way.

With this known device, the pressing of the dosing elements on the inner walling of the tube body and the connection of the dosing element to the tube body behind the calibrating device takes place inside the cooling installation. Owing to the relatively long route inside the cooling installation, this means that the tube body has cooled off by a considerable amount by the time it reaches the pressing and connecting point. In order to be able nevertheless to achieve a good connection of the dosing elements to the inner walling of the tube body, the dosing elements are led through a heating device during insertion and are heated to a particular temperature. A heating device of this kind is costly however and involved. Moreover no tube with a wall thickness of under 0.2 mm can be produced with the above-described device since the welding of the dosing element to the tube does not take place in a sure way.

A device of this kind is known from WO 99/62691. With this device the above-mentioned drawbacks are eliminated. It is difficult, however, in particular with thick-walled tube bodies to be able to determine the respective position of the dosing elements for putting in the bore, above all when these dosing elements have a mutual spacing which differs.

The object of the present invention thus consists in creating a device for manufacture of drip irrigation tubes in which the heating device for heating the dosing elements to be fed can be eliminated, with which an optimal connection between the dosing elements and the inner walling of the tube body can nevertheless be achieved, and with which in particular the position of the dosing elements which are placed in the tube body is determinable from outside.

This object is achieved according to the invention in that the pressing roller has an indentation corresponding to the outer contour of the tube body in the region of the calibrating device, and in that at least at the bottom of the indentation of the pressing roller a marking structure running over the entire circumference is provided which is transferable to the surface of the tube body in the area of the respective dosing element and serves the location of the position of the respective dosing element for putting in the outlet aperture.

With this configuration the extruded tube body is prevented from cooling down too much during the advance to the place where the pressing and connecting process takes place with respect to the dosing elements, so that the heating device for heating the dosing elements can be eliminated. In addition, a uniform pressure of the pressing roller over the entire width of the dosing element is achieved; the connection becomes optimal. The marking structure is optimally transferred onto the outer surface of the tube body in the area of the dosing elements. This marking of the surface of the tube body makes it possible for the position of the dosing element in the tube body to be precisely determinable from outside, so that the bore for the outlet aperture can be made at the correct place, regardless of the spacing apart of the dosing elements from one another.

An advantageous embodiment of the invention consists in the recess in the longitudinally elongated body area of the tubular body having the shape of a slot extending from the end of the longitudinally elongated body area, protruding into the cooling device, to the walling closing off the cooling device, through which the longitudinally elongated body area is led into the cooling device. A simple construction is thereby achieved.

The pressing member is advantageously designed as pressing roller. It is thereby ensured that the pressing pressure for connecting the dosing elements to the inner walling of the tube body is constant over the entire length of the dosing element, so that it is optimal, and excluded is the risk of affecting the labyrinth passage, for instance through too great pressing in particular regions.

Through the possibility of being able to adjust the pressing pressure of the pressing roller on the tube body, this pressure can be adapted to the nature of the tube and of the dosing element.

A further advantageous embodiment of the invention consists in the feed apparatus including a separating device, in which the next of the continuously fed dosing elements is able to be captured in each case, ejected in a way guided onto the guideway, and inserted into the tube body by means of an airstream along the guideway.

Drip irrigation tubes can thereby be produced whose dosing elements have a selectable spacing apart from one another. This is particularly advantageous, for instance, for the irrigation of trees or bushes in that the respective drip irrigation tube has a plurality of dosing elements with outlets, having a relatively small spacing apart from one another, in the vicinity of the roots of these plants. Between the plants however these drip irrigation tubes have no outlets over a larger distance, whereby this interim region is not irrigated as well.

Advantageously the separating unit is composed of two drivable rollers, disposed opposite one another, in each case one dosing element of the continuously fed dosing elements being able to be captured by the two rollers, brought into a waiting position, and ejected therefrom onto the guideway. In this way the dosing elements can be optimally installed with the desired spacing in the tube body.

Installed in the guideway is a sensor, with which the reaching of the waiting position of the respective dosing element can be detected, whereby a failure-free production process is ensured.

The airstream is producible with air jets which are formed by supply lines that come out into the guideway, the supply lines being disposed such that the airstream coming out hits the dosing element, to be advanced, at an angle of about 25°. Thus very fast and simple transport of the dosing elements is achieved; precision is ensured.

An embodiment of the present invention will be described more closely in the following, by way of example, with reference to the enclosed drawing.

Figure 3:
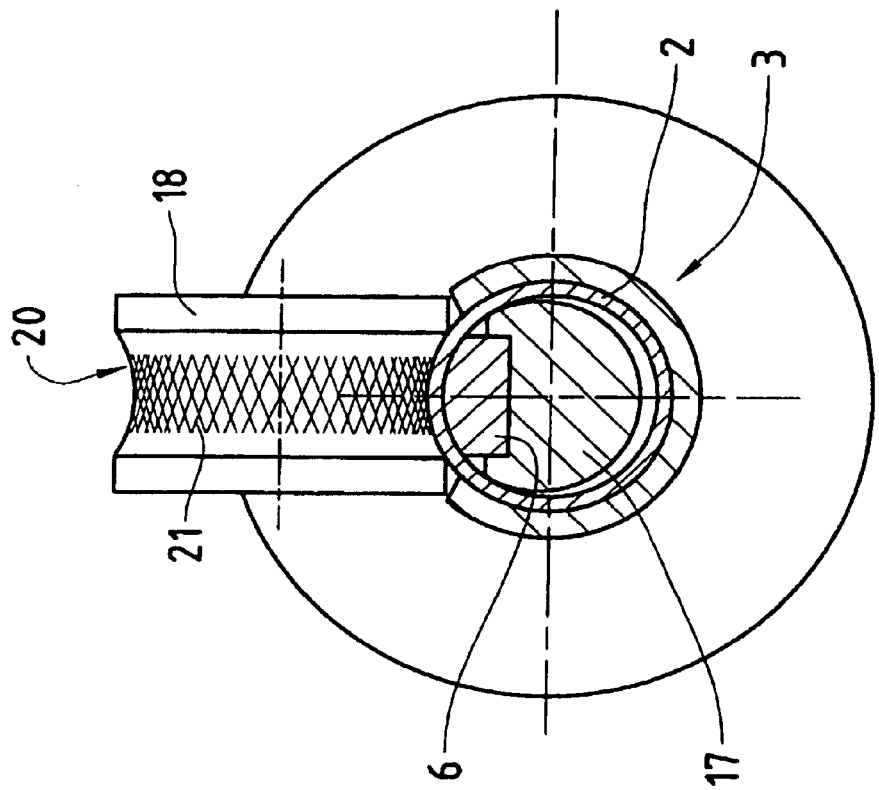
Figure 2:
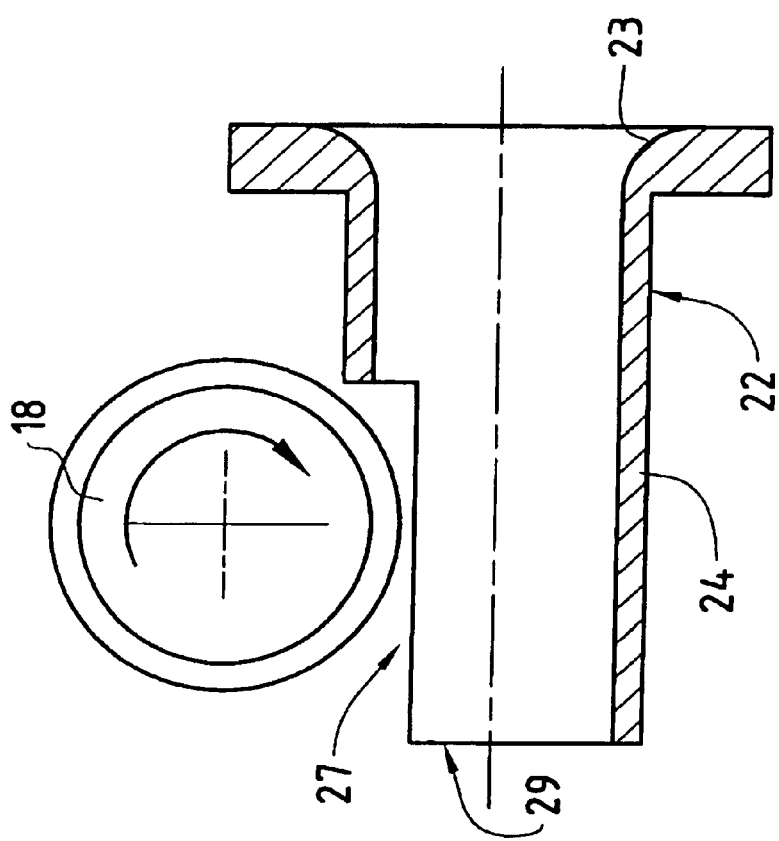
Figure 4:
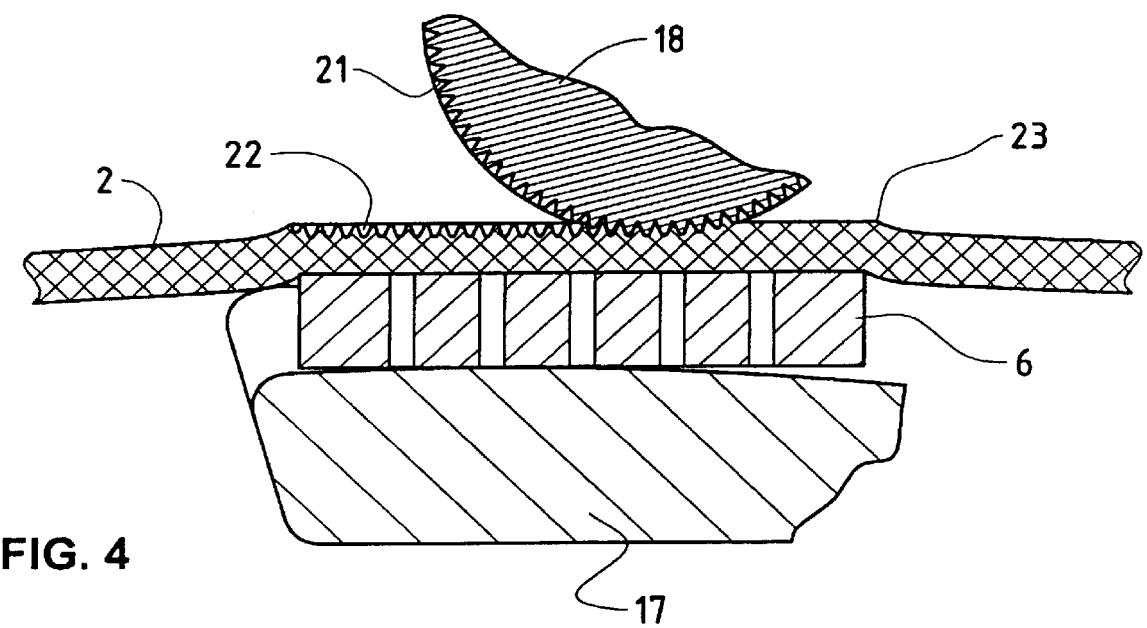

Shown are:

FIG. 1, a schematic sectional drawing of the device according to the invention in the region of the separating device, of the extrusion device, of the calibrating device and of the cooling device;

FIG. 2, a schematic representation of the calibrating device with the arrangement of the pressing roller;

FIG. 3, a cross-sectional representation in the region of the pressing roller transversely to the running direction of the extruded tube body; along line II-II according to FIG. 1, and FIG. 4, in section, the connection region of the dosing element to the tube body with the transferred marking structure, which is represented greatly enlarged in this figure.

FIG. 1 shows an extruding device 1, from which a tube body 2 is extruded in a known way. This tube body 2 is led into a calibrating device 3, and brought to the desired dimension. After the calibrating device 3, the calibrated tube body 2 passes through a cooling device 19 in a known way. The tube body 2 is led through devices (not shown) for further processing, and can be coiled up, for example.

Projecting into the tube body 2 is a guideway 4, which forms the continuation of a feed apparatus 5 for dosing elements 6, via which the dosing elements 6 are fed to a separating device 7 in a known way and in unbroken succession.

The separating device 7 comprises two drivable rollers 8 and 9, which are opposite one another. The two rollers 8 and 9 are equipped with a drive 10 or respectively 11, represented schematically, which are able to drive the two rollers 8 and 9 in the direction of the arrow. The two drives 10 and 11 are connected to a control device 12, represented schematically.

The foremost dosing element 6' of the dosing elements 6 led through the feed apparatus 5 is seized by the two rollers 8 and 9, and is brought into the waiting position shown here. This waiting position is monitored by a sensor 13 installed in the guideway 4, which sensor is also connected to the control device 12.

When the command is given by the control device 12, the dosing element 6' is conveyed out of this waiting position into the guideway 4 with great acceleration of the driven rollers 8 and 9. By means of the great acceleration, an interim space is created between the conveyed out dosing element 6' and the following dosing element 6. The speed of the rollers is reduced, the following dosing element 6 is seized by the rollers 8 and 9, and is brought in turn into the waiting position, after which the rollers 8 and 9 stand still until the next receipt of a signal.

The dosing element conveyed out into the guideway is captured by an airstream and is transported further.

The airstream is producible with air jets 14 in the guideway 4, which air jets 14 are formed by supply lines 15 which come out into a covering 16 that closes off the guideway 4 upwards. To achieve fast and optimal transport of the dosing elements over the guideway 4, the supply lines 15 are disposed such that the airstream coming out in each case hits the dosing element, to be advanced, at an angle of about 25°. The dosing element is thereby transported at a speed greater than the speed of the extruded tube. The dosing element can reach a speed of about 50 m/s, for example.

By means of this airstream, via the guideway 4, the dosing element reaches the region of the calibrating device 3, and is taken along by the leading extruded tube body 2, which passes through the calibrating device 3. This calibrating device 3 is formed by a tubular body 22 whose feed region 23 is designed trumpet-shaped and narrows to the desired diameter of the tube body 2. Adjacent to the feed region is a longitudinally elongated body area 24 which is led through an opening 25 in a walling 26 closing off the cooling device 19, and projects into the cooling device 19. In the embodiment example illustrated here, an interim plate 28 is inserted between the trumpet-shaped feed region 23 and the walling 26 of the cooling device.

The longitudinally elongated body area 24 is provided with a recess 27, into which a pressing member designed as a pressing roller 18 protrudes.

Disposed at the end region of the guideway 4 is a pressing element 17, on which the dosing element 6", which is taken along by the tube body 2, is supported. Co-operating with the pressing element 17 is the pressing roller 18 which is able to be pressed on the tube body 2 from the outside. By means of the pressing roller 18, which is synchronized with the facility speed, and by means of the pressing element 17, the dosing element 6" is pressed into the still very soft tube body 2, and is joined thereto. Through the use of a pressing roller 18 a pressure which remains constant is obtained over the entire length of the dosing element 6", so that the connection between the dosing element 6" and tube body 2 is able to take place in an optimal way. The pressing pressure of the pressing roller 18 can be adjusted in a known way and can be adapted to existing conditions.

The tube body 2 then passes through the cooling device 19 in a known way, where the tube body 2 is cooled down.

To achieve an optimal connection between dosing element and tube body 2, the pressing roller 18 is disposed inside the calibrating device 3, so that the material of the tube body 2 is not cooled down too much in the connecting region.

The interval size for the ejection of the respective dosing element 6' onto the guideway 4 can be programmed as desired via the control 12. The time span after ejection of the dosing element 6' from the rollers 8 and 9 until achievement of the tube body is very short and constant. Thus the spacing of a dosing element inserted into the tube body 2 with respect to the following dosing element can be very precisely determined at given feed rate of the tube body 2. As a result, the spacing can be maintained at practically any desired amount, whereby drip irrigation tubes can be produced which can be provided with dosing elements and outlets at the desired places.

FIG. 2 shows the tubular body 22, which forms the calibrating device 3, and which is made up of the feed region 23, designed trumpet-shaped, and the longitudinally elongated body area 24. The recess 27, which has the shape of a slot, extends from the end 29 of the longitudinally elongated body area 24, protruding into the cooling device 19 (FIG. 1), to the walling 26 closing off the cooling device 19. Protruding into this slot 27 is the pressing roller 18.

Achieved with this design is that the stretch inside the cooling device which the extruded tube body must pass through with the dosing elements until it has reached the place where the pressing of the dosing element with respect to the inner walling of the tube body, and thus the connection, takes place can be kept very minimal. The tube body does not cool off too much; the connection between the inner walling of the tube body with <sic. and> the dosing elements becomes optimal, without the dosing elements having to be preheated.

FIG. 3 shows in section the calibrating device 3, through which the tube body 2 is led. The pressing element 17 projects into the tube body 2, as has been described in relation to FIG. 1. At this pressing element 17 the dosing element 6 is disposed on the inner walling of the tube body 2. The outer surface of the tube body 2 is in contact with the pressing roller 18. By means of the pressing element 17 and the pressing roller 18, co-operating therewith, the dosing element 6 is pressed into the tube body 2, and is joined thereto. To obtain an optimal connection, the pressing roller 18 is provided with an indentation 20 corresponding with the outer contour of the tube body 2 in the area of the calibrating device 3. Advantageously the dosing element 6 is also designed cambered on the connection side to the tube body 2.

At the bottom of the indentation 20 of the pressing roller 18, a marking structure 21 can be applied running over the entire circumference. This marking structure 21 can be a fine knurl, for instance.

As can be seen from FIG. 4, this marking structure 21, which is shown greatly enlarged in FIG. 4, is transferred onto the surface of the tube body 2 since the tube body in this region is still very soft. Here the marking structure 21 is transferred only where a counter pressure exists, i.e. only over the length of the dosing element 6 that is connected to the tube body 2. When pressing the dosing element 6 into the walling of the tube body 2 a bulge 23 results on the outside corresponding to the outer contour of the dosing element 6. Supported thereby is the effect that the marking structure 21 is transferred onto the surface of the tube body 2 only in the area of the dosing element 6. If there is no dosing element 6 between the pressing element 17 and the pressing roller 18, no pressure arises on the pressing roller 18, and the marking structure 21 is thus not transferred onto the surface of the tube body 2.

Thus with this device a marking structure 22 is likewise obtained on the surface of the tube body 2 at those places where a dosing element 6 is located in the tube body. As can be seen in FIG. 1, this marking structure 22 can be detected in a known way and after leaving the cooling device 19, via detector means which co-operate with a boring device, so that the outlet can be bored at exactly the right place in the tube body 2. This makes possible a correct placement of the outlets in the tube body, regardless of how great the spacing distances between the individually inserted dosing elements are.

It would also be conceivable for the marking structure 21 to be inked on the pressing roller 18, and for this color to be transferred with the marking structure 21 onto the surface of the tube body 2, and for a colored marking structure 22 to be created in this way on the tube body 2, which would possibly facilitate the step of detection of the marking structure 22 on the tube body 2. An imprinting of this kind could be achieved with an offset printing method, for instance.

With the method according to the invention drip irrigation tubes can be produced which are provided with dosing elements which have any desired spacing apart from one another, so that the dosing elements and thus the dropwise discharge of water can be put at the desired place on the drip irrigation tube. Drip irrigation tubes of this kind can thus be adapted in any desired way to the respective planting configuration.

The invention claimed is:

1. Device for continuous manufacture of drip irrigation tubes, comprising an extruding device for producing a tube body, a calibrating device, and a cooling device for the tube body, a feed apparatus for feeding dosing elements into the tube body along a guideway, the feed apparatus including a separating device into which each of the continuously fed dosing elements is captured, ejected onto the guideway, and inserted into the tube body by means of an airstream along the guideway, the airstream being producible with air jets formed by supply lines that communicate with the guideway and are disposed such that the airstream hits the dosing element to be advanced at an angle of about 25°, and means for connecting the dosing elements to the inner walling of the tube body, comprising a pressing element which is formed by the end area of the guideway and which protrudes into the extruded tube body, and a pressing roller which is able to be pressed against the tube body from the exterior in the region of the pressing element, the calibrating device being formed by a tubular body whose feed region narrows to the desired diameter of the tube body and whose longitudinally elongated body area protrudes into the cooling device, and is provided with a recess into which the pressing member protrudes so that the pressing and connecting process of the dosing elements with respect to the inner walling of the tube body ensues inside the calibrating device, the pressing roller having an indentation that corresponds to the outer contour of the tube body in the region of the calibrating device and having a bottom provided with a marking structure, the pressing roller being configured to cause the marking structure to provide a mark on the surface of the tube body in the region of the respective dosing element so as to facilitate locating the respective dosing element in the tube body when placing an outlet aperture through the tube body and the respective dosing element.

2. Device according to claim 1, characterized in that the recess in the longitudinally elongated body area of the tubular body has the form of a slot which extends from the end of the longitudinally elongated body area, protruding into the cooling device, to the walling closing off the cooling device, through which the longitudinally elongated body area is led into the cooling device.

3. Device according to claim 1, characterized in that the pressing pressure of the pressing roller against the tube body is adjustable.

4. Device according to claim 1, characterized in that the separating device is made up of two drivable rollers, disposed opposite one another, and in that in each case one dosing element of the continuously fed dosing elements is able to be captured by the two rollers, brought into a waiting position, and ejected therefrom onto the guideway.

5. Device according to claim 4, characterized in that installed in the guideway is a sensor, with which the reaching of the waiting position of the respective dosing element is detectable.

6. Device according to claim 2, characterized in that the pressing pressure of the pressing roller against the tube body is adjustable.

7. Device according to claim 2, characterized in that the feed apparatus comprises a separating device, into which the next of the continuously fed dosing elements is able to be captured in each case, ejected in a way guided onto the guideway, and inserted into the tube body by means of an airstream along the guideway.

8. Device according to claim 1, wherein the marking structure comprises a pattern on the surface of the pressing roller configured to create a physical impression on the tube body.

9. A device for continuous manufacture of drip irrigation tubes comprising:
- an extruding device for creating an extruded tube body;
- a calibrating device for creating a shaped outer contour of the extruded tube body;
- a cooling device;
- a guideway;
- a dosing element feed apparatus; and
- a device for attaching dosing elements to an extruded tube body, comprising:
  - a pressing element protruding into the extruded tube body; and
  - a pressing roller located adjacent an outside surface of the extruded tube body and configured to be in pressing opposition to the pressing element as a dosing element passes therebetween, the pressing roller comprising:
    - a concave surface corresponding to the shaped outer contour of the extruded tube body; and
    - a marking structure on a portion of the concave surface and extending along an entire circumference of the pressing roller, the marking structure comprising a pattern on the surface of the pressing roller configured to create a physical impression on the surface of the extruded tube body in the region of a respective dosing element.

10. The device of claim 9, wherein the dosing element feed apparatus comprises a separating device configured to captured each dosing element and eject it along the guideway and an airstream configured to insert the dosing element into the tube body.

11. The device of claim 10, further comprising supply lines extending into the guideway, which produce the airstream.

12. The device of claim 11, wherein the supply lines are directed into the guideway such that the airstream hits the dosing elements at an angle of about 25°.

13. The device of claim 9, wherein the pattern of the marking structure is a fine knurl.

* * * * *